US012060487B2

(12) United States Patent
Coste et al.

(10) Patent No.: US 12,060,487 B2
(45) Date of Patent: Aug. 13, 2024

(54) TIRE COMPRISING A RUBBER COMPOSITION HAVING A PRO-OXIDANT AND A RUBBER CRUMB

(71) Applicant: COMPAGNIE GENERALE DES ETABLISSEMENTS MICHELIN, Clermont-Ferrand (FR)

(72) Inventors: Nathalie Coste, Clermont-Ferrand (FR); Severin Dronet, Clermont-Ferrand (FR); Guillaume Hennebert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 539 days.

(21) Appl. No.: 17/416,299

(22) PCT Filed: Dec. 13, 2019

(86) PCT No.: PCT/FR2019/053063
§ 371 (c)(1),
(2) Date: Jun. 18, 2021

(87) PCT Pub. No.: WO2020/128256
PCT Pub. Date: Jun. 25, 2020

(65) Prior Publication Data
US 2022/0064412 A1    Mar. 3, 2022

(30) Foreign Application Priority Data
Dec. 19, 2018 (FR) ........................................ 1873396
Jan. 30, 2019 (FR) ........................................ 1900828

(51) Int. Cl.
C08L 7/00 (2006.01)
B60C 1/00 (2006.01)

(52) U.S. Cl.
CPC ........ C08L 7/00 (2013.01); B60C 1/00 (2013.01); C08L 2312/00 (2013.01); C08L 2555/34 (2013.01)

(58) Field of Classification Search
CPC .................................... C08L 7/00; B60C 1/00
USPC ...................................................... 524/575.5
See application file for complete search history.

(56) References Cited

U.S. PATENT DOCUMENTS

| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,610,261 B1 | 8/2003 | Custodero et al. |
| 6,747,087 B2 | 6/2004 | Custodero et al. |
| 6,975,396 B2 | 12/2005 | Custodero et al. |
| 7,135,517 B2 | 11/2006 | Simonot et al. |
| 7,202,295 B2 | 4/2007 | Simonot et al. |
| 7,256,233 B2 | 8/2007 | Simonot et al. |
| 7,425,313 B2 | 9/2008 | Custodero et al. |
| 7,820,771 B2 | 10/2010 | Lapra et al. |
| 8,461,269 B2 | 6/2013 | Varagniat et al. |
| 8,883,929 B2 | 11/2014 | Gandon-Pain et al. |
| 11,046,838 B2 | 6/2021 | Thomasson et al. |
| 11,396,208 B2 | 7/2022 | Tregouet et al. |
| 2001/0034389 A1 | 10/2001 | Vasseur |
| 2002/0004549 A1 | 1/2002 | Custodero et al. |
| 2003/0202923 A1 | 10/2003 | Custodero et al. |
| 2004/0030017 A1 | 2/2004 | Simonot et al. |
| 2005/0171264 A1 | 8/2005 | Simonot et al. |
| 2005/0267242 A1 | 12/2005 | Custodero et al. |
| 2006/0009564 A1 | 1/2006 | Simonot et al. |
| 2007/0231532 A1 | 10/2007 | Walters et al. |
| 2008/0026244 A1 | 1/2008 | Barbotin et al. |
| 2008/0132644 A1 | 6/2008 | Lapra et al. |
| 2009/0270558 A1 | 10/2009 | Gandon-pain et al. |
| 2010/0022714 A1 | 1/2010 | Varagniat et al. |
| 2010/0168306 A1 | 7/2010 | Barbotin et al. |
| 2011/0021702 A1 | 1/2011 | Gandon-Pain et al. |
| 2011/0039976 A1 | 2/2011 | Vasseur |
| 2012/0208948 A1 | 8/2012 | Gandon-Pain et al. |
| 2020/0016939 A1 | 1/2020 | Merino Lopez |
| 2020/0095401 A1* | 3/2020 | Thomasson ............... C08L 7/00 |
| 2020/0101793 A1 | 4/2020 | Tregouet et al. |
| 2021/0130592 A1 | 5/2021 | Thomasson et al. |
| 2022/0055406 A1 | 2/2022 | Coste et al. |

FOREIGN PATENT DOCUMENTS

| CN | 1976987 A |  | 6/2007 |  |
| EP | 0501227 A1 |  | 9/1992 |  |
| EP | 0735088 A1 |  | 10/1996 |  |
| EP | 0810258 A1 |  | 12/1997 |  |
| FR | 2943680 A1 | * | 10/2010 | ............... B60C 1/00 |
| FR | 3060586 A1 |  | 6/2018 |  |
| FR | 3060588 A1 |  | 6/2018 |  |
| FR | 3060590 A1 |  | 6/2018 |  |
| GB | 2406273 A |  | 3/2005 |  |

(Continued)

OTHER PUBLICATIONS

Solid Waste Treatment and Resource Utilization, edited by Z. Lei, p. 191, China University of Mining and Technology Press (Xuzhou, Dec. 2017, 1st edition)(6-page translation).

(Continued)

Primary Examiner — Deve V Hall
(74) Attorney, Agent, or Firm — VENABLE LLP

(57) ABSTRACT

A tire comprises a rubber composition based on at least a rubber crumb, a diene elastomer, a pro-oxidant, a reinforcing filler and a crosslinking system, said rubber crumb representing 30% by mass or more of the composition, and exhibiting a ratio of the chloroform extract to the acetone extract of less than 2, the chloroform and acetone extracts being expressed as percentages by mass.

16 Claims, No Drawings

(56) References Cited

FOREIGN PATENT DOCUMENTS

| JP | 2016-108381 A | 6/2016 | | |
|---|---|---|---|---|
| WO | 97/36724 A2 | 10/1997 | | |
| WO | 99/16600 A1 | 4/1999 | | |
| WO | 99/28376 A2 | 6/1999 | | |
| WO | 00/005300 A1 | 2/2000 | | |
| WO | 00/005301 A1 | 2/2000 | | |
| WO | 00/73372 A1 | 12/2000 | | |
| WO | 02/053634 A1 | 7/2002 | | |
| WO | 2004/003067 A1 | 1/2004 | | |
| WO | 2004/056915 A1 | 7/2004 | | |
| WO | 2006/069792 A1 | 7/2006 | | |
| WO | 2006/069793 A1 | 7/2006 | | |
| WO | 2008/003434 A1 | 1/2008 | | |
| WO | 2008/003435 A1 | 1/2008 | | |
| WO | 2009/083160 A1 | 7/2009 | | |
| WO | 2010/039327 A1 | 4/2010 | | |
| WO | 2018/055537 A1 | 3/2018 | | |
| WO | 2018/115715 A1 | 6/2018 | | |
| WO | 2018/115718 A1 | 6/2018 | | |
| WO | 2018/115720 A1 | 6/2018 | | |
| WO | WO-2018115719 A1 * | 6/2018 | ........... | B60C 1/0016 |

OTHER PUBLICATIONS

Handbook of Plastic and Rubber Additives, edited by L. Shiguang, p. 557, Beijing Light Industry Press (Beijing, Sep. 1995, 1st edition)(4-page translation).
International Search Report dated Mar. 6, 2020, in corresponding PCT/FR2019/053063 (4 pages).

* cited by examiner

TIRE COMPRISING A RUBBER COMPOSITION HAVING A PRO-OXIDANT AND A RUBBER CRUMB

BACKGROUND

The invention relates to tires comprising at least one rubber composition comprising a rubber crumb.

Indeed, it is at the current time advantageous for tire manufacturers to find solutions to lower the costs of rubber compositions without penalizing the performance of the tires using these compositions.

It is also of interest to the manufacturers to promote the recycling of end-of-life tires into new tires with a view to reducing the environmental impact of their activity.

The grinding or the micronization of vulcanized rubber compositions produces granules or particles generally referred to as rubber crumbs.

In this context, it is known in the prior art that rubber crumbs can be used in tires. For example, document WO2018/115715 proposes the use in a tire sidewall of compositions which may comprise 23 phr, or 30 phr, or up to 50 phr or 54 phr of various crumbs. These amounts correspond to percentages by mass of less than 25% by mass in the compositions.

It is also known from document WO2010/039327 that compositions for tires may also be prepared from masterbatches comprising up to 50% by mass of crumb, said compositions comprising in these cases up to 17% by mass of crumbs, for example in the R4 composition from this document.

The applicant has now shown that very high amounts of crumb could be used within compositions for tires. In particular, the applicant has found a means for obtaining excellent stiffness properties in compositions comprising a diene elastomer, a pro-oxidant and 30% by mass or more of a specific crumb.

SUMMARY

The invention therefore relates to a tire comprising a rubber composition based on at least a rubber crumb, a diene elastomer, a pro-oxidant, a reinforcing filler and a crosslinking system, said rubber crumb representing 30% by mass or more of the composition, and exhibiting a ratio of the chloroform extract to the acetone extract of less than 2; the chloroform and acetone extracts being expressed as percentages by mass.

DETAILED DESCRIPTION

The tire according to the invention will preferably be selected from tires intended to equip a two-wheeled vehicle, a passenger vehicle, or else a "heavy-duty" vehicle (that is to say, underground trains, buses, off-road vehicles, heavy road transport vehicles, such as trucks, tractors or trailers), or else aircraft, construction equipment, heavy agricultural vehicles or handling vehicles.

Constituents of the Composition

The rubber compositions for the tire according to the invention are based on at least a rubber crumb, a diene elastomer, a pro-oxidant, a reinforcing filler and a crosslinking system, said rubber crumb representing 30% by mass or more of the composition, and exhibiting a ratio of the chloroform extract to the acetone extract of less than 2; the chloroform and acetone extracts being expressed as percentages by mass.

The expression "composition based on" should be understood as meaning a composition comprising the mixture and/or the product of the in situ reaction of the various base constituents used, some of these constituents being able to react and/or being intended to react with each other, at least partially, during the various phases of manufacture of the composition or during the subsequent curing, modifying the composition as it is prepared at the start. Thus, the compositions as employed for the invention can be different in the non-crosslinked state and in the crosslinked state.

Moreover, for the purposes of the present patent application, the term "phr", which is well known to those skilled in the art, means part by weight per hundred parts of elastomers, within the meaning of the preparation of the composition before curing. That is to say, in the case of the presence of a rubber crumb in a composition, the term "phr" means part by weight per hundred parts of "new" elastomers, thus excluding from the base 100 the elastomers contained in the rubber crumb. Of course, the crumb itself has a rubber composition, the ingredients of which can also be expressed in phr, the term "phr" in this case denoting the amount in parts by weight per hundred parts of elastomers, within the meaning of the distinctive composition of the crumb.

In the present description, unless expressly indicated otherwise, all the percentages (%) shown are mass percentages. Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b).

The compounds mentioned in the description may be of fossil or biobased origin. In the latter case, they may be partially or totally derived from biomass or may be obtained from renewable starting materials derived from biomass. Polymers, plasticizers, fillers, etc. are notably concerned.

Rubber Crumb

The composition of the invention also comprises a rubber crumb (abbreviated to "crumb" in the remainder of the text).

The crumbs are in the form of granules (or grains), optionally put into the form of a rubber slab. Generally, rubber crumbs result from a grinding or from a micronization of cured rubber compositions already used for a first application, for example in tires; they are a product of recycling of the materials. The crumbs are preferably provided in the form of microparticles.

The term "microparticles" is understood to mean particles which exhibit a size, namely their diameter in the case of spherical particles or their greatest dimension in the case of anisotropic particles, of a few tens of or a few hundred microns.

The crumbs are usually composed of a composition based on an elastomer and on a filler. They also usually comprise all the ingredients used in rubber compositions, such as plasticizers, antioxidants, vulcanization additives, and the like.

The crumbs can be simple ground/micronized rubber materials, without other treatment. It is also known that these crumbs can undergo a treatment in order to modify them. This treatment can consist of a chemical functionalization or devulcanization modification. It can also be a thermomechanical, thermochemical, biological, and the like, treatment.

Depending on the constituents of the crumbs and on the treatment they may have undergone, they usually have an acetone extract of between 3% and 30% by mass, and a chloroform extract of between 5% and 85% by mass.

In certain documents, the use of particular "regenerated" crumbs ("reclaimed rubber crumbs"), which have a morphology modified by thermal and/or mechanical and/or biological and/or chemical treatment, has been described. These regenerated crumbs generally have an acetone extract of between 5% and 20% by mass, and a chloroform extract of between 15% and 85% by mass, the latter having a mass-average molecular mass (Mw) of greater than 10 000 g/mol. In regenerated crumbs, the ratio of the chloroform extract to the acetone extract, expressed as mass percentage, is generally greater than or equal to 2. Lastly, regenerated crumbs have a Mooney viscosity (conventionally expressed in Mooney units, MU) of generally between 40 and 90. These regenerated crumbs, although they have certain known advantages, result from a particular treatment which entails additional product costs and technical characteristics leading to properties which differ from the crumbs which have not undergone such a treatment. As examples of such regenerated crumbs, mention may be made of the commercial products "Wuxi fine reclaim", which has a content of acetone extract of 9% and a content of chloroform extract of 37.2%; or "Nantong HT tire reclaim", which has a content of acetone extract of 12.7% and a content of chloroform extract of 28.3%.

For the purposes of the invention, a specific crumb will be selected exhibiting a ratio of the chloroform extract to the acetone extract of less than 2, and preferably of less than or equal to 1.5; the chloroform and acetone extracts being expressed as percentages by mass.

Preferably, the crumb has an acetone extract of between 3% and 15% by mass, more preferably from 3% to 10% by mass.

Likewise, it is preferable for the crumb to have a chloroform extract of between 3% and 20% by mass, more preferably from 5% to 15% by mass.

Preferably, the chloroform extract of the rubber crumb has a mass-average molecular mass (Mw) of less than 10 000 g/mol, preferably of less than 8000 g/mol.

Likewise preferably, the crumb exhibits an average particle size (D50) of between 10 and 400 µm, preferably between 50 and 250 µm and more preferably between 70 and 220 am.

Preferably for the invention, the crumb which has not undergone any modification by thermal and/or mechanical and/or biological and/or chemical treatment.

Preferably, the crumb of use in the invention comprises a diene elastomer. This elastomer preferably represents at least 30% by mass of the crumb, the percentage being determined according to the standard ASTM E1131. It is preferably selected from the group consisting of polybutadienes, polyisoprenes including natural rubber, butadiene copolymers and isoprene copolymers. More preferably, the molar content of units of diene origin (conjugated dienes) present in the diene elastomer is greater than 50%, preferably between 50% and 70%.

Preferably for the invention, the crumb contains between 5% and 70% by mass of filler, more preferably between 10% and 60%, and very preferably between 15% and 50%.

The term "filler" is understood here to mean any type of filler, whether it is reinforcing (typically having nanometric particles, preferably with a weight-average size of less than 500 nm, in particular between 20 and 200 nm) or whether it is non-reinforcing or inert (typically having micrometric particles, preferably with a weight-average size of greater than 1 µm, for example between 2 and 200 am). The weight-average size of the nanometric particles is measured in a manner well known to those skilled in the art (by way of example, according to application WO2009/083160 paragraph 1.1). The weight-average size of the micrometric particles can be determined by mechanical sieving.

Mention will in particular be made, as examples of fillers known as reinforcing to those skilled in the art, of carbon black or of a reinforcing inorganic filler, such as silica or alumina in the presence of a coupling agent, or mixtures thereof.

According to a preferred embodiment of the invention, the crumb comprises, by way of filler, a reinforcing filler, in particular a carbon black or a mixture of carbon blacks.

The carbon black or the mixture of carbon blacks preferably represents more than 50%, more preferably more than 80%, even more preferably more than 90% by mass of the weight of the reinforcing filler of the crumb. According to a more preferred embodiment, the reinforcing filler consists of a carbon black or a mixture of carbon blacks.

Very preferably, the carbon black is present in the crumb at a content ranging from 20% to 40% by mass, more preferably from 25% to 35% by mass.

All carbon blacks, in particular blacks of the HAF, ISAF, SAF, FF, FEF, GPF and SRF type, conventionally used in rubber compositions for tires ("tire-grade" blacks) are suitable as carbon blacks.

The crumb can contain all the other usual additives which participate in a rubber composition, in particular for a tire. Among these usual additives, mention may be made of liquid or solid plasticizers, non-reinforcing fillers such as chalk, kaolin, protective agents and crosslinking agents. These additives may be in the crumb in the form both of a residue or of a derivative, since they were able to react during the steps of producing the composition or of crosslinking the composition from which the crumb is derived. In the crumbs of use for the invention, the crosslinking system is preferably a vulcanization system, that is to say based on sulfur (or on a sulfur-donating agent) and on a vulcanization accelerator.

The crumbs of use for the invention are commercially available and those skilled in the art will know how to identify the crumbs of use for the invention, in particular by analysis of the chloroform and acetone extracts and the ratio thereof, as discussed above. Crumbs suitable for the invention include "PD80" from Lehigh Technologies, which has a content of acetone extract of 7% and a content of chloroform extract of 7.3%; or "RNM60" from Rubber Resources, which has a content of acetone extract of 7.4% and a content of chloroform extract of 8.2%.

The crumb itself, if it is not directly commercially purchased, can be obtained according to the grinding or micronization techniques known to those skilled in the art.

The grinding can be carried out by various technologies, for example by a mechanical process of grinding with a Kahl type grinding wheel, or else by cryogenic impact micronization technologies, which make it possible to obtain particles of small size on rubber materials. Commercial items of equipment, such as the CUM150 mill from Netzsch or the CW250 mill from Alpine, can be used.

In the composition of the tire of the invention, the crumb is present at a content of 30% by mass or more, preferably at a content from 30% to 90% by mass, preferably from 33% to 80% and more preferably from 35% to 70%. Below 30%, 33% or even 35%, the stiffness would not be as improved on the one hand and the saving achieved would not be as advantageous on the other hand. Thus, very preferably, the amount of crumb is from 50% to 70% by mass.

These amounts, expressed in % by mass of composition, can also be expressed in the usual way for elastomeric compositions, in phr, relative to the amount of elastomer in the composition. Both ways of expressing the amount of crumb are used in the examples below.

Elastomer

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers may be classified into two categories: "essentially unsaturated" or "essentially saturated". The term "essentially unsaturated" generally refers to a diene elastomer at least partly derived from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and may notably be described as "essentially saturated" diene elastomers (low or very low content, always less than 15%, of units of diene origin).

The term "diene elastomer that may be used in the compositions in accordance with the invention" particularly means:
- (a)—any homopolymer of a conjugated or non-conjugated diene monomer having from 4 to 18 carbon atoms;
- (b)—any copolymer of a conjugated or non-conjugated diene having from 4 to 18 carbon atoms and of at least one other monomer.

The other monomer may be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as non-conjugated dienes are non-conjugated dienes having from 6 to 12 carbon atoms, such as 1,4-hexadiene, ethylidenenorbornene or dicyclopentadiene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

More particularly, the diene elastomer is:
- (a') any homopolymer of a conjugated diene monomer, in particular any homopolymer obtained by polymerization of a conjugated diene monomer having from 4 to 12 carbon atoms;
- (b') any copolymer obtained by copolymerization of one or more conjugated dienes with one another or with one or more vinylaromatic compounds having from 8 to 20 carbon atoms;
- (c') a copolymer of isobutene and of isoprene (butyl rubber) and also the halogenated versions, in particular chlorinated or brominated versions, of this type of copolymer;
- (d') any copolymer obtained by copolymerization of one or more conjugated or non-conjugated dienes with ethylene, an α-monoolefin or a mixture thereof, for instance the elastomers obtained from ethylene, from propylene with a non-conjugated diene monomer of the abovementioned type.

Preferably, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs). Preferably, the diene elastomer is selected from the group consisting of natural rubber, synthetic polyisoprenes and mixtures thereof.

Pro-Oxidant

The rubber compositions in accordance with the invention also comprise a pro-oxidant. These compounds are well known to those skilled in the art, sometimes also referred to as peptizers or free-radical generators, they are often combined with natural rubber in small amounts. Document WO2010/039327 discussed above describes, for example in composition MB2 of table 1, an amount of 0.15 phr of the peptizer DBD in the masterbatch.

For the purposes of the invention, the presence of such a pro-oxidant is necessary in order for the composition comprising a very high content of rubber crumb to exhibit the improved stiffness specific to the invention.

For the invention, the pro-oxidant can be any pro-oxidant known to those skilled in the art. It is preferably selected from the group consisting of alkali, alkaline earth or lanthanide metal salts; iron salts; cobalt salts; thiols; organic disulfides and mixtures thereof.

In the family of alkaline-earth, alkali or lanthanide metal salts, the pro-oxidant can advantageously be an acetylacetonate of an alkaline-earth, alkali or lanthanide metal.

Preferably, the alkaline-earth, alkali or lanthanide metal of the salt is selected from the group consisting of lithium, sodium, potassium, calcium, magnesium, lanthanum, cerium, praseodymium, neodymium, samarium, erbium and mixtures thereof. Again preferably, the salt of an alkaline-earth, alkali or lanthanide metal is a magnesium or neodymium salt. In other words, the salt of an alkaline-earth, alkali or lanthanide metal is advantageously a magnesium or neodymium acetylacetonate, preferably a magnesium acetylacetonate.

In the family of iron salts, the pro-oxidant can advantageously be selected from the group consisting of hemin, iron acetylacetonate and mixtures thereof.

In the family of cobalt salts, the pro-oxidant can advantageously be selected from the group consisting of abietates, acetylacetonates, tallates, naphthenates, resinates and mixtures thereof. Preferably, the cobalt salt is cobalt acetylacetonate (also referred to as Peconal-H or cobalt (II) 4-oxo-pent-2-en-2-olate).

In the family of thiols and organic disulfides, the pro-oxidant can advantageously be selected from the group consisting of 2,2'-dibenzamidodiphenyldisulfide (DBD), para-tert-butylphenol disulfide (APDS) and mixtures thereof.

The pro-oxidant is preferably selected from the group consisting of iron salts; cobalt salts; organic disulfides and mixtures thereof.

Preferably, the pro-oxidant is selected from the group consisting of hemin, iron acetylacetonate, cobalt acetylacetonate, 2,2'-dibenzamidodiphenyldisulfide (DBD), para-tert-butylphenol disulfide (APDS) and mixtures thereof.

More preferably, the pro-oxidant is selected from the group consisting of hemin, para-tert-butylphenol disulfide (APDS) and mixtures thereof.

The content of pro-oxidant in the composition is preferably from 0.1 phr to 15 phr, preferably from 0.1 to 10 phr and more preferably from 0.15 phr to 5 phr. Below this amount, the effect of the pro-oxidant could be insufficient, whereas a greater amount no longer makes it possible to improve the stiffness and therefore proves to be pointless and expensive.

Reinforcing Filler

The rubber composition of the invention can comprise one or more reinforcing fillers. Use may be made of any type of "reinforcing" filler known for its abilities to reinforce a rubber composition which can be used in particular in the manufacture of tires, for example an organic filler, such as carbon black, an inorganic filler, such as silica, or else a mixture of these two types of fillers.

All carbon blacks, in particular the blacks conventionally used in tires or their treads, are suitable as carbon blacks. Among said carbon blacks, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO97/36724-A2 and WO99/16600-A1).

Mention may be made, as examples of organic fillers other than carbon blacks, of functionalized polyvinyl organic fillers, such as described in applications WO2006/069792-A1, WO2006/069793-A1, WO2008/003434-A1 and WO2008/003435-A1.

The term "reinforcing inorganic filler" should be understood here as meaning any inorganic or mineral filler, whatever its color and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of tires. In a known manner, certain reinforcing inorganic fillers can be characterized in particular by the presence of hydroxyl groups (OH) on their surface.

Mineral fillers of the siliceous type, preferably silica ($SiO_2$), or of the aluminous type, especially alumina ($Al_2O_3$), are suitable in particular as reinforcing inorganic fillers. The silica used can be any reinforcing silica known to those skilled in the art, in particular any precipitated or fumed silica exhibiting a BET specific surface area and a CTAB specific surface area both of less than 450 $m^2/g$, preferably from 30 to 400 $m^2/g$, in particular from 60 to 300 $m^2/g$.

As other examples of inorganic fillers that can be used in the rubber compositions of the invention, mention may also be made of mineral fillers of the aluminous type, in particular alumina ($Al_2O_3$), aluminum oxides, aluminum hydroxides, aluminosilicates, titanium oxides, silicon carbides or nitrides, all of the reinforcing type as described for example in applications WO99/28376-A2, WO00/73372-A1, WO02/053634-A1, WO2004/003067-A1, WO2004/056915-A2, U.S. Pat. Nos. 6,610,261-B1 and 6,747,087-B2.

The physical state in which the reinforcing inorganic filler is provided is not important, whether it is in the form of a powder, of micropearls, of granules, or else of beads or any other appropriate densified form. Of course, reinforcing inorganic filler is also understood to mean mixtures of different reinforcing inorganic fillers, in particular of silicas as described above.

Those skilled in the art will understand that, instead of the reinforcing inorganic filler described above, a reinforcing filler of another nature could be used, as long as this reinforcing filler of another nature is covered with an inorganic layer such as silica, or else comprises functional sites, in particular hydroxyls, at its surface, requiring the use of a coupling agent to establish the bond between this reinforcing filler and the diene elastomer. By way of example, mention may be made of carbon blacks partially or completely covered with silica, or of carbon blacks modified by silica, such as, without limitation, the fillers of Ecoblack® type of the CRX2000 series or of the CRX4000 series from Cabot Corporation.

A person skilled in the art will know how to adjust the total content of reinforcing filler according to the use concerned, in particular according to the type of tires concerned, for example a tire for a motorbike, for a passenger vehicle or for a utility vehicle, such as a van or heavy-duty vehicle. Preferably, this total content of reinforcing filler is from 10 to 200 phr, more preferably from 30 to 180 phr, and more preferably still from 40 to 160 phr, the optimum being, in a known way, different according to the specific applications targeted.

According to an alternative form of the invention, the reinforcing filler is predominantly carbon black, that is to say that it comprises more than 50% by weight of carbon black relative to the total weight of reinforcing filler. According to an alternative form of the invention, the reinforcing filler consists of carbon black.

For carbon blacks, the STSA specific surface area is determined according to standard ASTM D6556-2016.

Preferably for the invention, the composition comprises from 10 to 80 phr of carbon black, more preferably from 30 to 70 phr.

If appropriate, in order to couple the reinforcing inorganic filler to the diene elastomer, use may be made, in a wellknown way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Crosslinking System

The composition of the tire of the invention comprises a crosslinking system. In this respect, any type of crosslinking system known to those skilled in the art for rubber compositions for tires may be used. It can in particular be based on sulfur, and/or on peroxide and/or on bismaleimides.

Preferably, the crosslinking system is based on sulfur; it is then called a vulcanization system. The sulfur can be contributed in any form, in particular in the form of molecular sulfur, or of a sulfur-donating agent. At least one vulcanization accelerator is also preferably present, and, optionally, also preferably, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferred content of between 0.5 and 12 phr, in particular between 1 and 10 phr. The vulcanization accelerator is used at a preferred content of between 0.5 and 10 phr, more preferably of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazole-sulfenamide ("CBS"), N,N-dicyclohexyl-2-benzothiazole-sulfenamide ("DCBS"), N-(tert-butyl)-2-benzothiazole-sulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

Other Possible Additives

The composition of the tire according to the invention may optionally also comprise all or some of the usual additives customarily used in elastomer compositions intended in particular for the manufacture of tires, such as, for example, non-reinforcing fillers, pigments, protective agents, such as antiozone waxes, chemical antiozonants or antioxidants, plasticizing agents, antifatigue agents, reinforcing resins, methylene acceptors (for example, phenol novolac resin) or methylene donors (for example, HMT or H3M).

It goes without saying that the invention relates to the rubber compositions described previously both in the "uncured" or non-crosslinked state (i.e., before curing) and in the "cured" or crosslinked, or also vulcanized, state (i.e., after crosslinking or vulcanization).

Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 200° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP A 0501227, EP A 0735088, EP A 0810258, WO0005300 or WO0005301.

The first (non-productive) phase is preferably performed in several thermomechanical steps. During a first step, the elastomer and the pro-oxidant are introduced into a suitable mixer such as a standard internal mixer, at a temperature between 20° C. and 100° C. and, preferably, between 25° C. and 100° C.

After a few minutes, preferably from 0.5 to 2 min and a rise in temperature to 90° C. to 110° C., the crumb is added all at once or in portions.

After a few minutes, preferably from 0.5 to 2 min and a rise in temperature to 100° C. to 120° C., the reinforcing fillers, the other ingredients (that is to say those which remain if not all were introduced at the start) are added all at once or in portions, with the exception of the crosslinking system, during a compounding ranging from 20 seconds to a few minutes.

The total duration of the kneading, in this non-productive phase, is preferably between 2 and 10 minutes at a temperature of less than or equal to 180° C. and preferably of less than or equal to 170° C.

After cooling of the mixture thus obtained, the crosslinking system is then incorporated at low temperature (typically less than 100° C.), generally in an external mixer, such as an open mill; the whole is then mixed (productive phase) for a few minutes, for example between 5 and 15 min.

The final composition thus obtained is subsequently calendered, for example in the form of a sheet or slab, notably for laboratory characterization, or else extruded, in order to form, for example, a rubber profiled element used in the manufacture of semi-finished products for tires. These products can subsequently be used for the manufacture of tires, according to techniques known to those skilled in the art.

The crosslinking of the composition can be carried out in a way known to those skilled in the art, for example at a temperature of between 130° C. and 200° C., under pressure.

The examples that follow illustrate the invention without, however, limiting it.

IMPLEMENTATION EXAMPLES OF THE INVENTION

Characterization of the rubber crumbs and of the rubber compositions of the examples In the examples, the rubber crumbs are characterized as indicated below.

Measurement of the Size of the Particles:

The size of the particles (in particular the D50) can be measured using a laser particle size analyzer of the mastersizer 3000 type from Malvern. The measurement is carried out by the liquid route, diluted in alcohol after an ultrasound pretreatment for 1 min in order to guarantee the dispersion of the particles. The measurement is carried out in accordance with standard ISO-13320-1.

Measurement of the Acetone Extract:

The acetone extract content is measured according to standard ISO1407 by means of an extractor of Soxhlet type.

A sample test specimen (between 500 mg and 5 g) is introduced into an extraction thimble and then placed in the extractor tube of the Soxhlet. A volume of acetone equal to two or three times the volume of the extractor tube is placed in the collector of the Soxhlet. The Soxhlet is subsequently assembled and then heated for 16 h.

The sample is weighed after extraction. The acetone extract content corresponds to the loss of mass of the sample during the extraction, related back to the initial mass thereof.

Measurement of the Chloroform Extract:

The chloroform extract content is measured according to standard ISO1407 by means of an extractor of Soxhlet type.

A sample test specimen (between 500 mg and 5 g) is introduced into an extraction thimble and then placed in the extractor tube of the Soxhlet. A volume of chloroform equal to two or three times the volume of the extractor tube is placed in the collector of the Soxhlet. The Soxhlet is subsequently assembled and then heated for 16 h.

The sample is weighed after extraction. The chloroform extract content corresponds to the loss of mass of the sample during the extraction, related back to the initial mass thereof.

Measurement of the Average Molecular Masses of the Chloroform Extract:

The molecular masses are determined by size exclusion chromatography, according to a Moore calibration and according to standard ISO16014.

The measurement of the weight-average molecular mass (Mw) of the chloroform extract is carried out by size exclusion chromatography (SEC) with a refractive index (RI) detector. The system is composed of an Alliance 2695 system from Waters, of a column oven from Waters and also of an RI 410 detector from Waters. The set of columns used is composed of two PL GEL MIXED D columns (300×7.5 mm 5 µm) followed by two PL GEL MIXED E columns (300×7.5 mm 3 µm) from Agilent. These columns are placed in a column oven thermostatically controlled at 35° C. The mobile phase used is non-antioxidized tetrahydrofuran. The flow rate of the mobile phase is 1 ml/min. The RI detector is also thermostatically controlled at 35° C.

The chloroform extract is dried under a nitrogen stream. The dry extract is subsequently taken up at 1 g/l in non-antioxidized tetrahydrofuran at 250 ppm with stirring for 2 hours. The solution obtained is filtered using a syringe and a single-use 0.45 µm PTFE syringe filter. 100 µl of the filtered solution are injected into the conditioned chromatographic system at 1 ml/min and 35° C.

The Mw results are provided by integration of the chromatographic peaks detected by the RI detector above a value of 2000 g/mol. The Mw is calculated from a calibration carried out using polystyrene standards.

Measurement of the Mass Fraction of Carbon Black:

The carbon black mass fraction is measured by thermogravimetric analysis (TGA) according to standard NF T-46-07, on an instrument from Mettler Toledo, model "TGA/DSC1".

Approximately 20 mg of sample are introduced into the thermal analyzer, then subjected to a thermal program from 25 to 600° C. under an inert atmosphere (pyrolyzable phase), then from 400 to 750° C. under an oxidizing atmosphere (oxidizable phase). The mass of the sample is measured continuously throughout the thermal program. The black content corresponds to the loss of mass measured during the oxidizable phase related back to the initial mass of sample.

In the examples, the rubber compositions are characterized, before and/or after curing, as indicated below.

Tensile Tests (after Curing)

These tensile tests make it possible to determine the moduli of elasticity and the properties at break and are based on standard NF ISO 37 of December 2005.

The nominal secant modulus (or apparent stress, in MPa, relative to the strain, which is unitless) is measured at 23° C. in second elongation (i.e., after an accommodation cycle at the extension rate provided for the measurement itself) at 10% elongation (denoted MA10).

The true stresses at break (in MPa) and the elongations at break (in %) may also be measured.

Rubber Compositions

The compositions are manufactured with introduction of all of the constituents into an internal mixer, with the exception of the vulcanization system, as described above. The vulcanization agents (sulfur and accelerator) are introduced onto an external mixer at low temperature (the constituent rollers of the mixer being at approximately 30° C.). The crumbs can be introduced into the internal or external mixer.

The object of the examples presented in tables 1 to 6 is to compare the different rubber properties of the compositions not in accordance with the invention (T1 to T4) to the properties of the compositions in accordance with the invention (C1 to C20). The amounts of the ingredients of the compositions are indicated in phr, and for the crumb a row has been added to indicate the amount in % by mass as mentioned in tables 1 to 6.

The MA10 moduli measured for all the compositions are indicated in the last row of tables 1 to 6, and it can be observed that the stiffness of the compositions in accordance with the invention is always improved compared to the compositions that are not in accordance with the invention.

Table 1 References:

(1) NR: Natural rubber (2) "OG80" crumb from CL PELLING having a content of acetone extract of 7.2 mol %, a content of chloroform extract of 7.9 mol % and a D50 of 180 µm (3) Carbon black, ASTM N234 grade (4) Hemin from bovine, purity ≥90%, from Aldrich (5) "Pristerene 4931" stearin from Uniqema (6) Zinc oxide, industrial grade—Umicore (7) N-Cyclohexyl-2-benzothiazolesulfenamide ("Santocure CBS" from Flexsys).

TABLE 1

|  | T1 | C1 | T2 | C2 | T3 | C3 | T4 | C4 |
|---|---|---|---|---|---|---|---|---|
| NR (1) | 100 | 100 | 100 | 100 | 100 | 100 | 100 | 100 |
| Crumb (2) in phr | 88 | 88 | 140 | 140 | 200 | 200 | 320 | 320 |
| Crumb in % | 35.3 | 34.6 | 46.5 | 45.7 | 55.4 | 54.6 | 66.5 | 65.8 |
| Carbon black (3) | 54 | 54 | 54 | 54 | 54 | 54 | 54 | 54 |
| Peptizer 1 (4) | 0 | 5 | 0 | 5 | 0 | 5 | 0 | 5 |
| Stearic acid (5) | 2.5 | 2.5 | 2.5 | 2.5 | 2.5 | 2.5 | 2.5 | 2.5 |
| Zinc oxide (6) | 2.7 | 2.7 | 2.7 | 2.7 | 2.7 | 2.7 | 2.7 | 2.7 |
| Accelerator (7) | 0.6 | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 | 1.5 |
| MA10 | 4.56 | 6.21 | 4.13 | 6.10 | 4.10 | 5.85 | 4.34 | 5.21 |

TABLE 2

|  | T3 | C3 | C5 | C6 | C7 | C8 |
|---|---|---|---|---|---|---|
| NR (1) | 100 | 100 | 100 | 100 | 100 | 100 |
| Crumb (2) in phr | 200 | 200 | 200 | 200 | 200 | 200 |
| Crumb in % | 55.4 | 54.6 | 55.3 | 55.3 | 55.1 | 53.9 |
| Carbon black (3) | 54 | 54 | 54 | 54 | 54 | 54 |
| Peptizer 1 (4) | 0 | 5 | 0.15 | 0.5 | 2 | 10 |
| Stearic acid (5) | 2.5 | 2.5 | 2.5 | 2.5 | 2.5 | 2.5 |
| Zinc oxide (6) | 2.7 | 2.7 | 2.7 | 2.7 | 2.7 | 2.7 |
| Accelerator (7) | 0.6 | 0.6 | 0.6 | 0.6 | 0.6 | 0.6 |
| Sulfur | 1.5 | 1.5 | 1.5 | 1.5 | 1.5 | 1.5 |
| MA10 | 4.10 | 5.85 | 4.91 | 5.10 | 5.48 | 6.85 |

TABLE 3

|  | T1 | C1 | C9 | C10 | C11 |
|---|---|---|---|---|---|
| NR (1) | 100 | 100 | 100 | 100 | 100 |
| Crumb (2) in phr | 88 | 88 | 88 | 88 | 88 |
| Crumb in % | 35.3 | 34.6 | 35.3 | 35.2 | 35.0 |
| Carbon black (3) | 54 | 54 | 54 | 54 | 54 |
| Peptizer 1 (4) | 0 | 5 | 0.15 | 0.5 | 2 |
| Stearic acid (5) | 2.5 | 2.5 | 2.5 | 2.5 | 2.5 |
| Zinc oxide (6) | 2.7 | 2.7 | 2.7 | 2.7 | 2.7 |
| Accelerator (7) | 0.6 | 0.6 | 0.6 | 0.6 | 0.6 |
| Sulfur | 1.5 | 1.5 | 1.5 | 1.5 | 1.5 |
| MA10 | 4.56 | 6.21 | 5.21 | 5.32 | 5.87 |

TABLE 4

|  | T1 | C12 | C13 | C14 |
|---|---|---|---|---|
| NR (1) | 100 | 100 | 100 | 100 |
| Crumb (2) in phr | 88 | 88 | 88 | 88 |
| Crumb in % | 35.3 | 35.3 | 35.2 | 34.6 |
| Carbon black (3) | 54 | 54 | 54 | 54 |
| Peptizer 2 (8) | 0 | 0.15 | 0.5 | 5 |
| Stearic acid (5) | 2.5 | 2.5 | 2.5 | 2.5 |
| Zinc oxide (6) | 2.7 | 2.7 | 2.7 | 2.7 |
| Accelerator (7) | 0.6 | 0.6 | 0.6 | 0.6 |
| Sulfur | 1.5 | 1.5 | 1.5 | 1.5 |
| MA10 | 4.56 | 5.29 | 5.14 | 5.41 |

Table 4 references:
(8) 2,2'-dibenzamidodiphenyldisulfide (DBD): "Renacit10" from Lanxess.

TABLE 5

|  | T3 | C3 | C15 | C16 | C17 | C18 |
|---|---|---|---|---|---|---|
| NR (1) | 100 | 100 | 100 | 100 | 100 | 100 |
| Crumb (2) in phr | 200 | 200 | 200 | 200 | 200 | 200 |
| Crumb in % | 55.4 | 54.6 | 54.6 | 54.6 | 54.6 | 54.6 |
| Carbon black (3) | 54 | 54 | 54 | 54 | 54 | 54 |
| Peptizer 1 (4) | 0 | 5 | 0 | 0 | 0 | 0 |
| Peptizer 2 (8) | 0 | 0 | 5 | 0 | 0 | 0 |
| Peptizer 3 (9) | 0 | 0 | 0 | 5 | 0 | 0 |
| Peptizer 4 (10) | 0 | 0 | 0 | 0 | 5 | 0 |
| Peptizer 5 (11) | 0 | 0 | 0 | 0 | 0 | 5 |
| Stearic acid (5) | 2.5 | 2.5 | 2.5 | 2.5 | 2.5 | 2.5 |
| Zinc oxide (6) | 2.7 | 2.7 | 2.7 | 2.7 | 2.7 | 2.7 |
| Accelerator (7) | 0.6 | 0.6 | 0.6 | 0.6 | 0.6 | 0.6 |
| Sulfur | 1.5 | 1.5 | 1.5 | 1.5 | 1.5 | 1.5 |
| MA10 | 4.10 | 5.85 | 4.95 | 5.85 | 4.72 | 5.11 |

Table 5 references:
(9) para-tert-butylphenoldisulfide (APDS): "Vultac TB7" from Arkema
(10) iron (III) acetylacetonate sold by Aldrich
(11) cobalt (II) acetylacetonate hydrate sold by Aldrich.

TABLE 6

|  | T3 | C3 | C19 | C20 |
|---|---|---|---|---|
| NR (1) | 100 | 100 | 0 | 0 |
| IR (12) | 0 | 0 | 100 | 0 |
| SBR (13) | 0 | 0 | 0 | 100 |
| Crumb (2) in phr | 200 | 200 | 200 | 200 |
| Crumb in % | 55.4 | 54.6 | 54.6 | 54.6 |
| Carbon black (3) | 54 | 54 | 54 | 54 |
| Peptizer 1 (4) | 0 | 5 | 5 | 5 |
| Stearic acid (5) | 2.5 | 2.5 | 2.5 | 2.5 |
| Zinc oxide (6) | 2.7 | 2.7 | 2.7 | 2.7 |
| Accelerator (7) | 0.6 | 0.6 | 0.6 | 0.6 |
| Sulfur | 1.5 | 1.5 | 1.5 | 1.5 |
| MA10 | 4.10 | 5.85 | 5.92 | 5.89 |

Table 6 references:
(12) IR: "SKI-3" from Nizhnekamsk
(13) SBR styrene content of 15%, content of 1.2: 25% of the butadiene part, Tg of −65° C.

The invention claimed is:

1. A tire comprising a rubber composition based on at least a rubber crumb, a diene elastomer, a pro-oxidant, a reinforcing filler and a crosslinking system,
    wherein the rubber crumb is present at a content from 50% to 70% by mass of the rubber composition and exhibits a ratio of a chloroform extract to an acetone extract of less than 2, the chloroform and acetone extracts being expressed as percentages by mass.

2. The tire according to claim 1, wherein the rubber crumb exhibits a ratio of the chloroform extract to the acetone extract of less than or equal to 1.5.

3. The tire according to claim 1, wherein the rubber crumb has an acetone extract of between 3% and 15% by mass.

4. The tire according to claim 1, wherein the rubber crumb has an acetone extract of from 3% to 10% by mass.

5. The tire according to claim 1, wherein the rubber crumb has a chloroform extract of between 3% and 20% by mass.

6. The tire according to claim 1, wherein the rubber crumb has a chloroform extract of from 5% to 15% by mass.

7. The tire according to claim 1, wherein the rubber crumb exhibits an average particle size (D50) of between 10 and 400 μm.

8. The tire according to claim 1, wherein the rubber crumb exhibits an average particle size (D50) of between 50 and 250 μm.

9. The tire according to claim 1, wherein the rubber crumb exhibits an average particle size (D50) of between 70 and 220 μm.

10. The tire according to claim 1, wherein the diene elastomer is selected from the group consisting of polybutadienes (BR), natural rubber (NR), synthetic polyisoprenes (IR), butadiene copolymers, isoprene copolymers, and mixtures thereof.

11. The tire according to claim 1, wherein the diene elastomer is selected from the group consisting of natural rubber, synthetic polyisoprenes, and mixtures thereof.

12. The tire according to claim 1, wherein the pro-oxidant is selected from the group consisting of iron salts, cobalt salts, organic disulfides, and mixtures thereof.

13. The tire according to claim 1, wherein the pro-oxidant is selected from the group consisting of hemin, iron acetylacetonate, cobalt acetylacetonate, 2,2'-dithiobisbenzanilide (DBD), tert-butylphenol disulfide (APDS), and mixtures thereof.

14. The tire according to claim 1, wherein the pro-oxidant is present at a content from 0.1 phr to 15 phr.

15. The tire according to claim 1, wherein the pro-oxidant is present at a content from 0.1 to 10 phr.

16. The tire according to claim 1, wherein the reinforcing filler is carbon black.

* * * * *